No. 701,907. Patented June 10, 1902.
D. MAGGIORA & P. & E. BLANCHI.
DEVICE FOR PREVENTING HAIL.
(Application filed Oct. 26, 1901.)
(No Model.) 3 Sheets—Sheet 1.
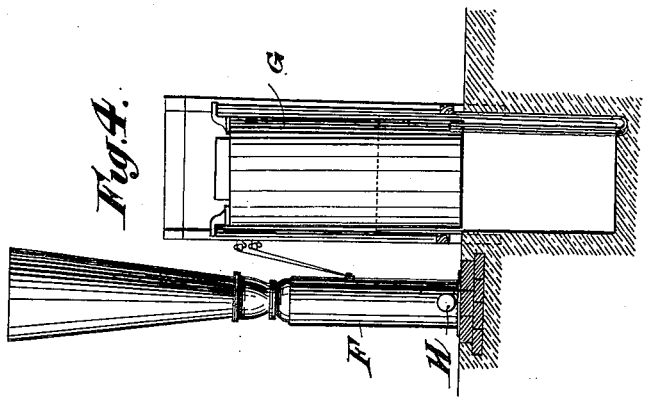
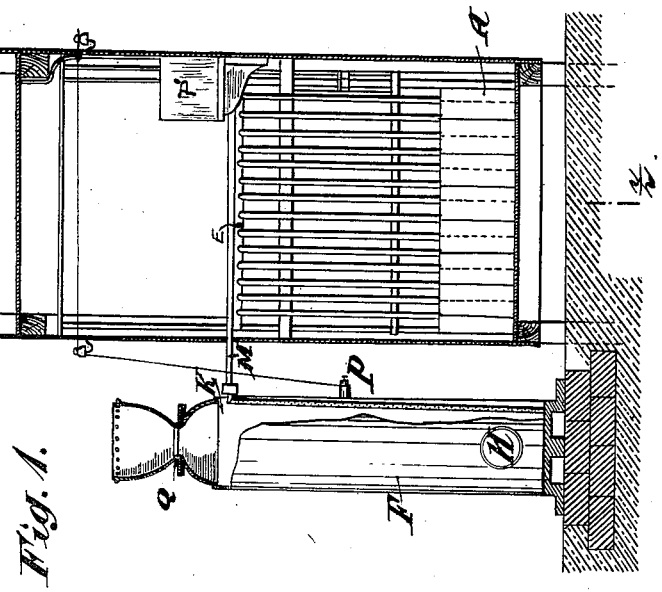

No. 701,907. Patented June 10, 1902.
D. MAGGIORA & P. & E. BLANCHI.
DEVICE FOR PREVENTING HAIL.
(Application filed Oct. 26, 1901.)
(No Model.) 3 Sheets—Sheet 2.
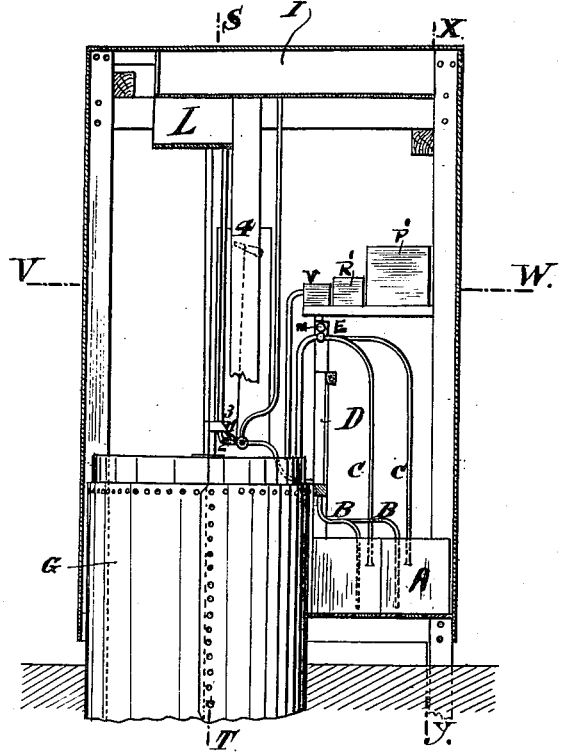
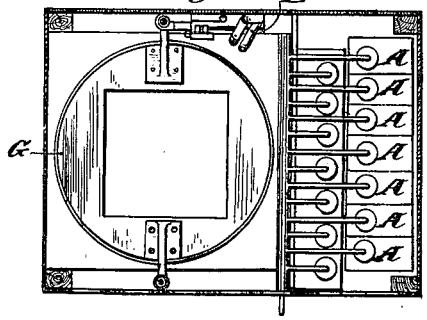

No. 701,907. Patented June 10, 1902.
D. MAGGIORA & P. & E. BLANCHI.
DEVICE FOR PREVENTING HAIL.
(Application filed Oct. 26, 1901.)
(No Model.) 3 Sheets—Sheet 3.
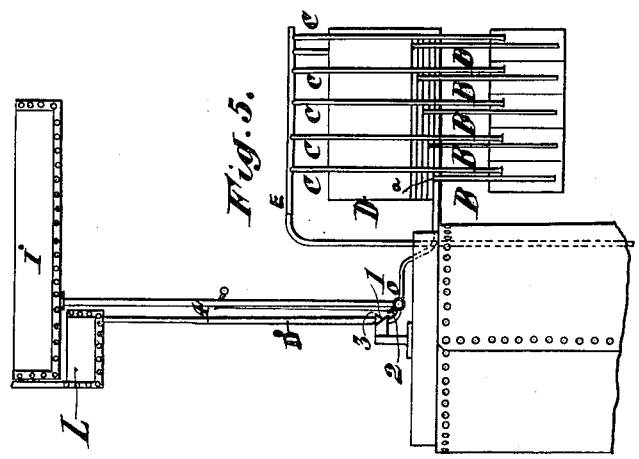
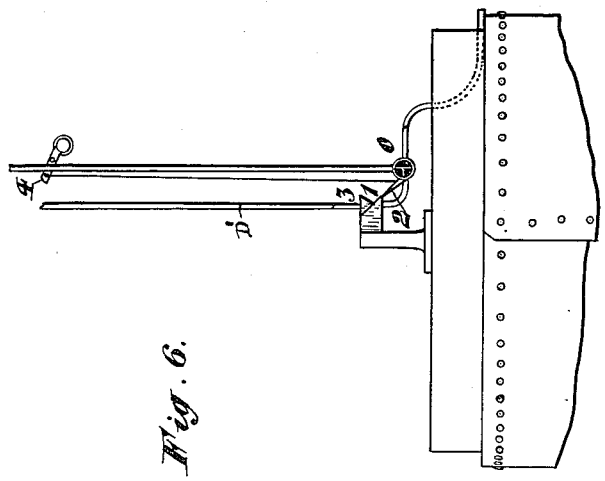
Witnesses:
Demetrio Maggiora
Paolo Blanchi
Ernesto Blanchi
Inventors
per
Attorney.

UNITED STATES PATENT OFFICE.

DEMETRIO MAGGIORA, PAOLO BLANCHI, AND ERNESTO BLANCHI, OF TURIN, ITALY.

DEVICE FOR PREVENTING HAIL.

SPECIFICATION forming part of Letters Patent No. 701,907, dated June 10, 1902.

Original application filed January 28, 1901, Serial No. 45,177. Divided and this application filed October 26, 1901. Serial No. 80,132. (No model.)

*To all whom it may concern:*

Be it known that we, DEMETRIO MAGGIORA, PAOLO BLANCHI, and ERNESTO BLANCHI, subjects of the King of Italy, and residents of Turin, Italy, have invented certain new and useful Improvements in Devices for Preventing Hail, of which the following is a specification, the present application being a division of our prior application, Serial No. 45,177, filed January 28, 1901.

Our present invention relates to improved devices for preventing hail; and it consists of the construction and combination of parts fully described and claimed hereinafter.

In the accompanying drawings, Figure 1 is a vertical sectional view of the improved apparatus, the section being on line X Y, Fig. 2. Fig. 2 is a section on line R Z, Fig. 1. Fig. 3 is a horizontal section on line V W, Fig. 2. Fig. 4 is a vertical section on line S T, Fig. 2. Fig. 5 is a diagrammatical view showing a removable generator. Fig. 6 is a detail view of parts hereinafter described.

Broadly stated, the invention comprises, first, a generator serving to produce a suitable gas to be mixed with atmospheric air for the purpose of producing an explosive compound; second, a gun or similar device in which is effected the explosion of the mixture of gases, and, third, the devices for electrically operating the apparatus, igniting the mixture at a distance.

The generator hereinafter described and shown in the accompanying drawings is arranged to produce acetylene gas, though if properly modified it may serve to produce any other suitable gas, such as hydrogen and the like. Said generator comprises fourteen closed metal boxes A, filled with calcium carbid. The number and size of said boxes may of course be varied as desired. Each box A is provided with two tubes B C, preferably made of lead, the tube B extending to the bottom of the box and connected to the water-feeder D, while the tube C is inserted into the cover-plate of the box and extended to a slight distance into said box. The tubes C are connected to a common collecting-pipe E, leading the gas produced into a gas-holder G.

The water-feeder D consists of a tank into which extend the tubes B. The upper mouths of the latter are not located in a common horizontal plane, but said mouths are all located at different heights. The bottom part of the tank D is connected, through a pipe D', provided with a two-way cock and a regulator L, to a reservoir I.

The gun or similar device consists of a metal chamber F, into which passes acetylene gas through the tube M, provided with perforations in order to uniformly distribute the gas through said chamber and produce a homogeneous mixture of gas and air, the chamber containing about twelve per cent. of air. The tube M is provided at K with a small flap-valve, preventing the gas during the explosion period from flowing back into the tube M. The bottom part of the chamber F is provided with outwardly-opening valves H for the purpose of enabling air to enter the chamber immediately after the explosion and preventing the combustion gases from flowing back into the chamber F after each explosion.

P represents an electric igniter producing the explosion by means of an electric spark.

The chamber F is provided with an outwardly-flaring mouth Q, serving to slightly divert the gases into the atmosphere.

The electric arrangement comprises a relay R', receiving the electric current from a central station through the agency of a line and ground wire. Said relay closes the circuit of a battery P', connected to the gun, and two electromagnets adapted to open and close the valve V, admitting gas from the gas-holder into the gun. The quantity of gas admitted into the gun is regulated by the time during which said valve remains open. A second line-wire and a second relay are provided to close the circuit between the battery and a coil, the latter inducing the current between the points of the igniter P to produce the explosion of the explosive mixture.

The operation of the apparatus is as follows: When the gas-holder G is moved downwardly by reason of the consumption of gas in the gun F, the finger 1 engages the finger 2 of the two-way cock O and turns the latter to an angle of about forty-five degrees, whereby the regulator L, filled with water, will be in communication with the distributer D when water arrives at the mouth $a$ of the first tube B, through which the water contained in the regulator L will enter the first box A. Thus a great quantity of acetylene gas will be instantaneously produced, which gas flows through the pipes C and E into the gas-holder G, which is moved upwardly. In this movement the finger 3 engages the finger 4, which operates the cock O to connect the reservoir I again to the regulator L. Said regulator serves to contain always the same quantity of water, which then flows into the tank D and the first box A and afterward into the second and third, and so on. Therefore it will be seen that the apparatus operates quite automatically. When all the boxes are filled with water, the cover-plates thereof are removed and other boxes filled with carbid are substituted therefor.

It will be seen from the foregoing description that we provide a very economical apparatus for producing explosions for the purpose of preventing hail, said apparatus being adapted to be operated simultaneously or separately from a central station located at any desired distance from the ground to be protected against hail.

Having fully described our invention, what we claim, and desire to secure by Letters Patent, is—

1. In an apparatus of the character set forth, the combination of a plurality of closed boxes filled with substances to produce explosive gas by means of a suitable liquid, means for introducing liquid successively into said boxes, a suitable gas-holder, and communicative connections between the latter and the boxes, with a suitable explosion-chamber and communicative connections between the latter and the gas-holder, substantially as set forth.

2. In an apparatus of the character set forth, the combination of a plurality of closed boxes filled with substances to produce explosive gas by means of a suitable liquid, means for introducing liquid successively into said boxes, a suitable gas-holder and communicative connections between the latter and the boxes, with a suitable explosion-chamber, an outwardly-flaring open mouth on the upper end thereof, communicative connections between the gas-holder and the explosion-chamber, means for admitting air into the explosion-chamber after each explosion, and an electric device for igniting the explosive mixture in said chamber, from a distant station, substantially as set forth.

In testimony whereof we have hereunto set our hands in presence of two witnesses.

DEMETRIO MAGGIORA.
PAOLO BLANCHI.
ERNESTO BLANCHI.

Witnesses:
HUGO PIZZOTTI,
MAUROQUO TIRONE.